US006248432B1

(12) United States Patent
Moronuki et al.

(10) Patent No.: US 6,248,432 B1
(45) Date of Patent: Jun. 19, 2001

(54) INK JET RECORDING SHEET

(75) Inventors: Katsumi Moronuki, Koganei; Motoko Hiraki, Warabi; Yoshiaki Nakamura; Hideyasu Asakage, both of Tokyo, all of (JP)

(73) Assignees: Oji Paper Co., Ltd.; Tohto Kasei Co., LTD, both of Tokyo (JP)

( * ) Notice: Subject to any disclaimer, the term of this patent is extended or adjusted under 35 U.S.C. 154(b) by 0 days.

(21) Appl. No.: 08/948,042

(22) Filed: Oct. 9, 1997

(30) Foreign Application Priority Data

Oct. 9, 1996 (JP) .................................................. 8-287501

(51) Int. Cl.[7] ........................................................ B32B 3/26
(52) U.S. Cl. ........................ 428/304.4; 428/195; 428/327
(58) Field of Search .................................... 428/195, 349, 428/352, 483, 520, 336, 337, 206, 207, 304.4, 327; 162/135, 164.1

(56) References Cited

U.S. PATENT DOCUMENTS 5,102,734 * 4/1992 Marbrow et al. .................... 428/349
5,695,608 * 12/1997 Yagi et al. .......................... 162/135

FOREIGN PATENT DOCUMENTS 63-176174 7/1988 (JP) .

OTHER PUBLICATIONS

Japanese Industrial Standard, "Testing Methods for Total Amine Values of Amine–based Hardeners of Epoxide Resins," JIS K 7237, 1986.

* cited by examiner

*Primary Examiner*—Bruce H. Hess
*Assistant Examiner*—Michael Grendzynski
(74) *Attorney, Agent, or Firm*—Arent Fox Kintner Plotkin Kahn

(57) ABSTRACT

An ink jet recording sheet having an excellent jet ink-fixing property and heat-sealing property and capable of recording thereon ink images having excellent water resistance and light fastness has an ink receiving layer formed on a surface of a support sheet and including a binder and fine particles of a water-insoluble, amino group-containing resin having a total amine value of 5 to 500 and preferably a glass transition temperature of 15 to 250° C.

9 Claims, No Drawings

INK JET RECORDING SHEET

BACKGROUND OF THE INVENTION

Field of the Invention

The present invention relates to a recording sheet for an ink jet-recording system. More particularly, the present invention relates to an ink jet recording sheet having an enhanced jet ink-fixing property and capable of recording thereon stable ink images which have excellent water resistance and light fastness. Therefore, the ink in the recorded images does not blot from the images even in a high humidity atmosphere and the recorded images are not deteriorated even when exposed to light irradiation over a long time.

In an embodiment of the present invention, the ink jet recording sheet has an ink receiving layer capable of being heat-sealed with a heat-sealant tape or stamp, and this is usable as a packing sheet for an article and the packed article can be sealed by the heat sealant tape or stamp.

In another embodiment of the present invention, the ink jet receiving sheet has an ink receiving layer formed on a surface of a support sheet and a heat-bonding layer formed on the opposite surface of the support sheet, and is usable as a packing sheet, sealing portions of the packing sheet being capable of being heat-sealed between the ink-receiving layer surface and the opposite heat-bonding layer surface.

Description of the Related Art

It is known that a conventional ink jet recording sheet is prepared by impregnating a support sheet with a mixture of inorganic particles, which can absorb a recording ink, with a binder or by coating a surface of a support sheet with a coating liquid containing inorganic particles, which can absorb a recording ink, and a binder, by using a blade coater, a bar coater, or a roll coater, to form an ink receiving layer on the surface of the support sheet. Accompanying the recent expansion in use of the ink jet recording sheet, the resultant ink images formed on an ink receiving layer of the ink jet recording sheet are required to exhibit enhanced water resistance and light fastness.

However, the conventional ink receiving layer of the ink jet recording sheet, comprising inorganic pigment particles and a binder is disadvantageous in that the ink images recorded on the ink receiving layer exhibit not only an unsatisfactory light fastness but also an insufficient water resistance and a poor resistance to bloting of the ink when left to stand in a high humidity atmosphere.

Also, since the conventional ink receiving layer formed on a surface of a support sheet and comprising the inorganic pigment particles has an insufficient heat-sealing property, when the ink jet recording sheet is used as a packing sheet and sealing end portions of the packing sheet are sealed by a heat-sealant, the ink receiving layer surface cannot be heat-bonded to an opposite surface of the support sheet, unless the opposite surface of the support sheet has a heat-bonding property. Namely, when the opposite surface of the support sheet has no heat-bonding property, the ink jet recording sheet used as a packing sheet cannot be sealed at the sealing end portions thereof by a heat-sealing method.

SUMMARY OF THE INVENTION

An object of the present invention is to provide an ink jet recording sheet having a good ink-fixing property, capable of recording thereon stable ink images having excellent water resistance and light fastness, and thus exhibiting a superior resistance to blotting of ink even in a high humidity atmosphere and a high resistance to deterioration in color even when exposed to light irradiation over a long time.

Another object of the present invention is to provide an ink jet recording sheet having an ink receiving layer formed on a support sheet and capable of being heat-sealed.

Still another object of the present invention is to provide an ink jet recording sheet having an ink receiving layer formed on a surface of a support sheet and capable of being heat-sealed with the opposite surface of the support sheet.

The above-mentioned objects can be attained by the ink jet recording sheet of the present invention which comprises a support sheet, and an ink receiving layer formed on a surface of the support sheet and comprising fine particles of water-insoluble, amino group-containing resin having a total amine value of 5 to 500 and mixed with a binder.

The water-insoluble, amino group-containing resin usable for the present invention preferably has a glass transition temperature of 15 to 250° C.

In the ink jet recording sheet of the present invention, the water-insoluble, amine group-containing resin is preferably a reaction product of a compound having at least one epoxy group per molecule thereof with a compound having at least one amino group per molecule thereof.

Also, the epoxy group-containing compound is preferably selected from those of the formulae (1) and (2):

(1)

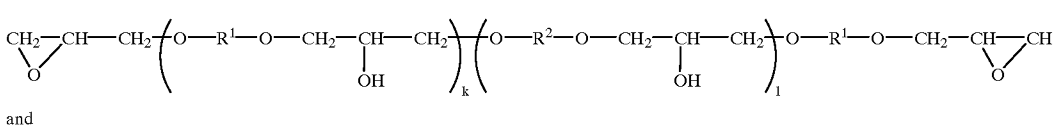

and (2)

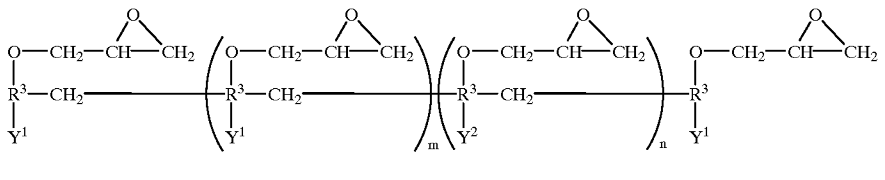

wherein —O—$R^1$—O— and —O—$R^2$—O— respectively and independently from each other represent a member selected from the group consisting of divalent residues of aromatic dihydoxyaryl compounds and divalent residues of aliphatic dihydric alcohols which may contain at least one aryl moiety; k and l respectively and independently from each other represent an integer of 0 or 1 or more; —O—$R^3$ represents a residue of a monohydroxyaryl compound; $Y^1$ and $Y^2$ respectively and independently from each other represent a member selected from the group consisting of a hydrogen atom and halogen atoms, glycidyl ether groups, alkyl groups preferably having 1 to 20 carbon atoms, aryl groups preferably having 6 to 26 carbon atoms; and aralkyl groups preferably having 7 to 27 carbon atoms, the alkyl, aryl and aralkyl groups respectively may be substituted with at least one glycidyl moiety; and n and m respectively and independently from each other represent an integer of 0 or 1 or more.

In the ink jet recording sheet of the present invention, the ink receiving layer formed on a surface of a support sheet and comprising fine particles of a water-insoluble, amino group-containing resin having a total amine value of 5 to 500 and mixed with a binder, can be heat-bonded with the opposite surface of the support sheet.

In the heat bondable ink receiving layer of the heat-bonding ink jet recording sheet of the present invention, the water-insoluble, amino group-containing resin is preferably a reaction product of a compound having at least one epoxy group per molecule thereof with a compound having at least one amino group per molecule thereof.

The epoxy group-containing compound is preferably selected from those of the formulae (1) and (2):

plastic films, for example, polyethylene, polypropylene, polyethylene terephthalate, polycarbonate, polyphenylene sulfide, polyetherimide, polysulfone, polystyrene, nylon, cellulose diacetate and cellulose triacetate films, paper sheets, nonwoven fabrics and laminates of the above mentioned sheet materials.

By using a support sheet having a hot melt bonding property or by forming a coating layer having a hot melt bonding property on the opposite surface of the support sheet to the surface on which the ink receiving layer is formed, the resultant ink jet recording sheet of the present invention has an enhanced heat-bonding property of the ink receiving layer formed on a surface of the support sheet to the opposite surface of the support sheet. When the ink jet recording sheet is employed as a packing material, a sealing portion can be formed between the ink receiving layer formed on a surface of the support sheet and the opposite surface of the support sheet by heat-sealing.

In order that the surface of the support sheet of the ink jet recording sheet of the present invention, opposite to the surface on which the ink receiving layer is formed, has a hot melt bonding property, preferably the support sheet is formed from non-oriented film of polyethylene, polypropylene or polyvinyl chloride. If the hot melt bonding property of the support sheet per se is insufficient, a heat-bonding layer may be formed from a hot melt bonding resin on the opposite surface of the support sheet.

The heat bonding layer may be formed by laminating, on the opposite surface of the support sheet, a HDPE, LDPE, (1)

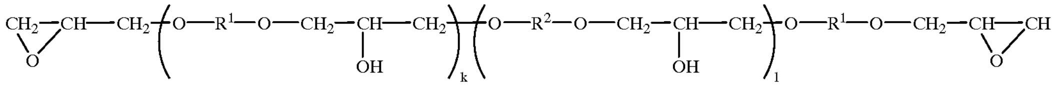

and (2)

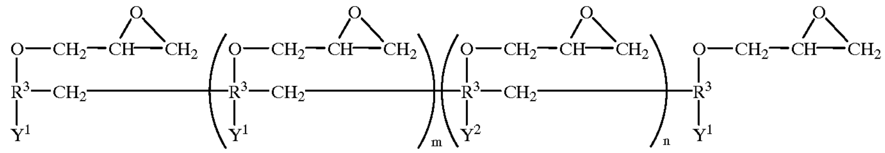

wherein —O—$R^1$—O— and —O—$R^2$—O— respectively and independently from each other represent a member selected from the group consisting of divalent residues of aromatic dihydoxyl compounds and divalent residues of aliphatic dihydric alcohols; k and l respectively and independently from each other represent an integer of 0 or 1 or more; —O—$R^3$— represents a residue of monohydroxyaryl compound; $Y^1$ and $Y^2$ respectively and independently from each other represent a member selected from the group consisting of a hydrogen atom, halogen atoms, glycidyl ether groups, alkyl groups preferably having 1 to 20 carbon atoms, aryl groups preferably having 6 to 26 carbon atoms; and aralkyl groups preferably having 7 to 27 carbon atoms, the alkyl, aryl and aralkyl groups respectively may be substituted with at least one glycidyl moiety; and n and m respectively and independently from each other represent an integer of 0 or 1 or more.

DESCRIPTION OF THE PREFERRED EMBODIMENT

In the ink jet recording sheet of the present invention, as a support sheet on which an ink receiving layer is formed, L.LDPE, ionomer, ethylene-propylene copolymer, ethylene-butene copolymer, propylene-butene copolymer, ethylene-propylene-butene copolymer, non-oriented PE or non-oriented EVA film by a dry laminating method or an extrusion laminating method. Otherwise, the heat bonding layer may be formed by laminating an EVA, syndiotactic 1,2-polybutadiene, ethylene-propylene random copolymer or copolyester film which has a low orientating property and a high heat bonding property at a low temperature, on the opposite surface of the support sheet.

In a procedure for forming a heat-bonding layer by the laminating method, an anchor agent, for example, an organic titanate, polyethyleneimine, polyurethane or polyester is coated on the opposite surface of the support sheet, and a hot melt bonding resin, for example, a polypropylene (PP), ethylene-vinyl acetate copolymer (EVA) or ionomer resin, is extruded into the form of a film and laminated on the anchor agent layer, by an extrude-laminating method. Alternatively, the support sheet having the heat-bonding layer formed on the opposite surface thereof can be produced by a coextrude-laminating method in which, two melt-extrudes are used, a support sheet-forming resin is melt-extruded in the form of a film or sheet through one of the extruders and simultaneously a hot melt bonding resin is melt-extruded in the form of a film through another one of the extruders and the two resin melts are connected to each other inside of an extruding die or in the opening of the die to form a two-layered laminate structure.

The support sheet laminated with a heat-bonding layer consisting of an oriented resin film having a low orientating property and a high hot melt-bonding property at a low temperature can be produced by orientating a laminate film consisting of a non-orientated plastic resin film and a non-orientated hot melt bonding resin film.

Preferably, before forming the ink receiving layer on a surface of the support sheet, a portion of the support sheet surface on which the ink receiving layer will be formed is subjected to a surface treatment for enhancing the bonding property thereof.

In an example of the bonding property-enhancing treatment, an anchor resin layer is formed from an aqueous dispersion of a polyacrylic resin, polyurethane resin or thermoplastic elastomer resin or a solution of a polyester resin in an organic solvent, on a surface of the support sheet, and the ink receiving layer is coated on the resultant anchor resin layer. The bonding strength between the support sheet and the ink receiving layer can be enhanced by the anchor resin layer.

When the dry amount of the anchor resin layer is less than 0.05 $g/m^2$, it is difficult to form the anchor resin layer uniformly. Also, when the dry amount of the anchor resin layer is more than 3.0 $g/m^2$, the bonding strength-enhancing effect of the anchor resin layer is saturated and thus an economical disadvantage occurs. Therefore, when the anchor resin layer is formed, the dry amount of the anchor resin layer is preferably about 0.05 to 3.0 $g/m^2$.

In another example of the bonding property-enhancing treatment, a portion of the surface of the support sheet on which the ink receiving layer will be formed is subjected to a corona-discharge treatments in a nitrogen or carbon dioxide gas atmosphere.

The ink receiving layer can be formed by coating a surface of the support sheet with an aqueous coating liquid comprising a resin for forming the binder and a pigment comprising fine particles of a water-insoluble, amino group-containing resin which provide pores formed therebetween to cause the resultant ink receiving layer to exhibit an enhanced ink-absorbing performance and an improved ink-fixing performance and serve as stabilizing agent for enhancing a storage stability, water resistance and light resistance of printed materials, and optionally an additional pigment comprising organic particles other than the above-mentioned fine resin particles or inorganic particles, a dispersing agent, a thickening agent, an antifoamer, antioxidant, wetting agent and/or water-resisting agent.

The resin usable for the binder of the ink receiving layer is preferably selected from those having a high compatibility with the fine particles of the water-insoluble, amino group-containing resin and a high affinity to the jet ink, a high permeability of the ink or a high swelling property with the ink. The preferable resins for the binder include water-soluble polymeric materials, for example, polyvinyl alcohols, starch, starch derivatives, which are used as an aqueous solution thereof, and water-insoluble polymeric materials, for example, polyacrylic resins, polyurethane resins, and styrene-butadiene copolymer resins, which are used as an aqueous emulsion thereof.

As a binder resin for the ink receiving layer, a water-soluble polymeric material is preferably used because the water-soluble polymeric material has a high compatibility with the fine particles of the water-insoluble, amino group-containing resin contained in the ink receiving layer and high affinity to, permeability or swelling property with the ink for the ink jet printing. Also, since the fine particles of the amino group-containing resin dispersed in the water-soluble polymeric binder resin can form pores therebetween, the resultant ink receiving layer is spongy and exhibits an enhanced ink-absorbing property. In this embodiment, the ink receiving layer exhibits a high ink receiving property for a thermal transfer image printing system. Therefore, this type of recording sheet is useful not only for the ink jet recording system but also for the thermal transfer recording system.

The water-soluble polymeric material is preferably selected from starch, starch-derivatives, cellulose derivatives, for example, hydroxyethyl cellulose, methyl cellulose and carboxymethyl cellulose, gelatin, casein, polyvinyl alcohol, modified polyvinyl alcohol, for example, silicone-modified polyvinyl alcohols, acrylamide-modified polyvinyl alcohols, and carboxyl-modified polyvinyl alcohols, styrene-maleic anhydride copolymer, and ethylene-maleic anhydride copolymer, and used in the form of an aqueous solution thereof. Among the above-mentioned water-soluble polymeric materials, silicon-modified polyvinyl alcohols, acrylic amide-modified polyvinyl alcohols and carboxyl-modified polyvinyl alcohols are preferably employed.

The binder consisting of the water-soluble polymeric material is used preferably in an amount of 5 to 60 parts by weight per 100 parts by weight of the fine particles of the water insoluble, amino group-containing resin. However, the amount of the water-soluble binder resin is not limited to the above-mentioned range. Usually, when the amount of the water-soluble binder resin is less than parts by weight, the pores may not be formed in an amount sufficient to absorb the ink in a satisfactory amount, and thus the resultant ink receiving layer may exhibit an insufficient ink absorbing property. Also, when the amount of the water-soluble binder resin is more than 60 parts by weight, the pores formed between the fine particles of the water-insoluble, amino group-containing resin may be filled by the binder resin, and thus the resultant ink receiving layer may exhibit an insufficient ink-absorbing property.

The water-insoluble, amino group-containing resin usable for the ink-receiving layer of the present invention has a total amine value of 5 to 500 and optionally exhibits a glass transition temperature of 15° C. to 250° C. Then term "total amine value" refers to the number of mg of potassium hydroxide (KOH) which is equivalent to the perchloric acid needed to neutralize total basic nitrogen contained in lg of sample, and is expressed by unitless number: The total amine value is determined in accordance with Japanese Industrial Standard (JIS) K 7237-1986.

The following is a summary of the testing method. Dissolve the sample in the mixture solvent of o-nitrotoluene and acetic acid, and titrate it with 0.1 N perchloric acid dissolved in acetic acid by using a glass electrode and reference electrode. Plotting the relation between the reading by a potentiometer or pH meter and the equivalent volume of 0.1 N perchloric acid dissolved in acetic acid required for titration, take an inflexion point on a titration curve as the end point. Calculate the total amine value from the consumed volume of 0.1 N perchloric acid dissolved in acetic acid.

When the total amine value of the water-insoluble, amino group-containing resin, from which the fine particles to be dispersed in the ink receiving layer are formed, is less than 5, the resultant ink receiving layer exhibits an insufficient ink-fixing performance for the jetted ink. Also, when the total amine value is more than 500, the ink images recorded on the resultant ink receiving layer exhibits an unsatisfactory humidity resistance.

To enhance the ink-fixing performance of the ink receiving layer for the jetted ink and the humidity resistance of the recorded images on the ink receiving layer, preferably, the fine particles of the water-insoluble, amino group-containing resin have a total amine value of 10 to 500, more preferably, 30 to 400.

Also, when the glass transition temperature of the water-insoluble, amino group-containing resin is less than 15° C., since the resin may exhibit a melt bonding property at a low temperature, the resultant ink receiving layer may be sticky and may exhibit a low ink-absorbing rate for the jetted ink. In view of the above-mentioned phenomena, the more preferable glass transition temperature of the fine particles of the water-insoluble, amino group-containing resin is 30° C. or more.

When the glass transition temperature of the water-insoluble, amino group-containing resin is more than 250° C., the resultant resin may exhibit an insufficient dividing property to provide fine particles thereof, thus the resultant particles may have an insufficient fineness, and the resultant ink receiving layer may exhibit an insufficient ink-fixing property for the jetted ink and an unsatisfactory water resistance. From the point of view of the above-mentioned phenomena, the more preferable glass transition temperature of the fine particles of the water-insoluble, amino group-containing resin is 200° C. or less.

Accordingly, the fine particles of the water-insoluble, amino group-containing resin to be contained in the ink receiving layer preferably has a total amine value of 10 to 500 and a glass transition temperature of 30 to 200° C., more preferably a total amine value of 30 to 400 and a glass transition temperature of 30 to 200° C.

The above-mentioned glass transition temperature of the fine particles of the water-insoluble, amino group-containing resin can be determined by a differential scanning calorimeter (DSC) at a temperature-rising rate of 10° C./minute.

The amine group-containing resin for forming the fine particles must be insoluble in water to impart a high water resistance to the ink images recorded on the resultant ink receiving layer. As long as the amino group-containing resin is insoluble in water, the resin may be cross-linked or not cross-linked.

In the ink receiving layer of the ink jet recording sheet of the present invention, the fine particles of the water-insoluble, amino group-containing resin having a total amine value of 5 to 500 are preferably produced from a reaction product of a compound having at least one epoxy group per molecule thereof with a compound having at least one of amino group.

The compound having at least one epoxy group per molecule thereof for producing the reaction product is preferably selected from those of the formulae (1) and (2):

(1)

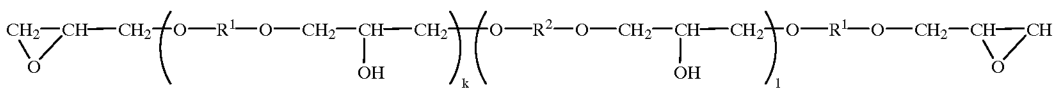

and (2)

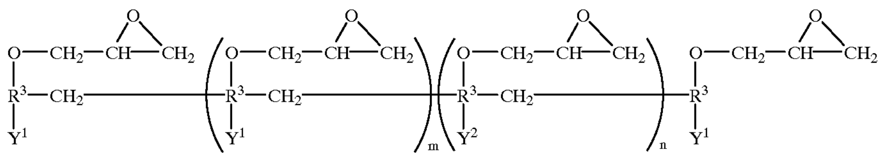

In the formulae (1) and (2), —O—$R^1$—O— and —O—$R^2$—O— respectively and independently from each other represent a member selected from the group consisting of residues of aromatic dihydroxyl compounds and residues of aliphatic dihydric alcohols; k and l respectively and independently from each other represent an integer of 0 or 1 or more; —O—$R^3$ represents a residue of a monohydroxyaryl compound; $Y^1$ and $Y^2$ respectively and independently from each other represent a member selected from the group consisting of a hydrogen atom and halogen atoms, glycidyl ether groups, alkyl groups preferably having 1 to 20 carbon atoms, aryl groups preferably having 6 to 26 carbon atoms; and aralkyl groups preferably having 7 to 27 carbon atoms, the alkyl, aryl and aralkyl groups respectively may be substituted with at least one glycidyl moiety; and n and m respectively and independently from each other represent an integer of 0 or 1 or more.

Namely, $R^1$ and $R^2$ represent, respectively and independently from each other, a member selected from a phenylene group and divalent hydrocarbon groups.

The epoxy compound of the formula (1) may be an epoxidizing product of a dihydroxyaryl compound. The aromatic dihydroxyaryl compound may be selected from bis-phenol compounds which are condensation reaction products of mono-hydroxyaryl compounds with ketone or aldehyde compounds, sulfur or oxygen-containing bis-phenol compounds, bisphenol compounds, dihydroxybenzenes and derivatives thereof, and diphydroxynaphthalenes and derivatives thereof.

Particularly, the epoxy compounds of the bis-phenol compounds and bisphenol compounds include those of the formula (3):

(3)

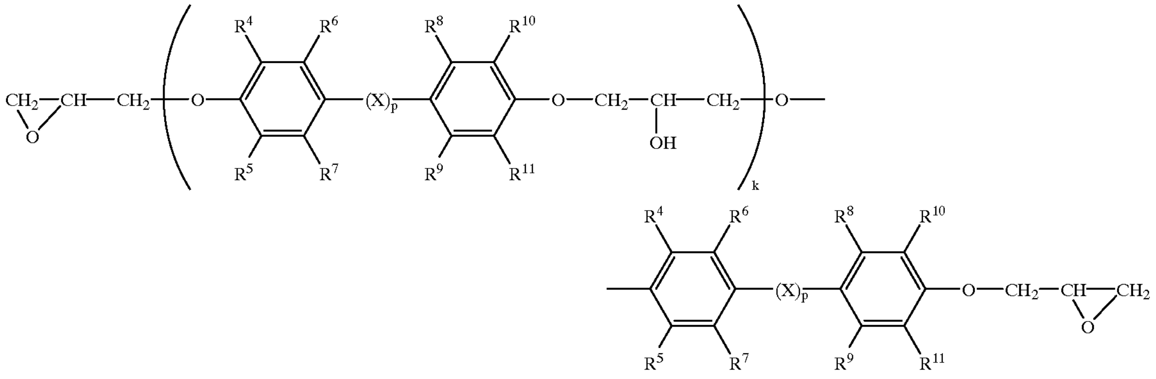

In the formula (3) $R^4$ to $R^{11}$ respectively and independently from each other represent a member selected from hydrogen atom, alkyl groups preferably having 1 to 4 carbon atoms, and halogen atoms, X represents a divalent atom or group selected from $—CH_2—$, $—C(CH_3)_2—$, $—C(CF_3)_2—$, $—S—$, $—SO_2—$, $—O—$ and $—CO—$, p represents an integer of 0 or 1, and k is as defined above.

The epoxy compounds of the dihydroxybenzenes and derivative thereof include those of the formula (4):

The dihydric aliphatic alcohol which may contain one or more aryl moieties, may be selected from saturated and insaturated aliphatic dihydric alcohols having 1 to 40 carbon atoms and arylalkyl dihydric alcohols and arylalkenyl dihydric alcohols.

The epoxy compounds of the formula (2) include epoxidizing products of condensation reaction products of monohydroxyaryl compounds, bis-phenol compounds, biphenol compounds, tri- or more-hydroxybenzene compounds, or poly-hydroxy naphthalene compounds with formaldehyde.

(4)

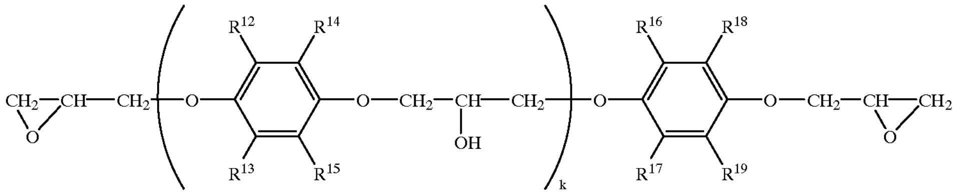

In the formula (4), $R^{12}$ to $R^{19}$, which may be different from or the same as each other, respectively represent a member selected from a hydrogen atom, an alkyl group preferably having 1 to 4 carbon atoms and halogen atoms, and k is as defined above.

The epoxy compounds of the dihydroxynaphthalenes and derivatives thereof include those of the formula (5):

There is no limitation to the type of the amino group-containing compounds to be reacted with the above-mentioned epoxy compounds to prepare the water-insoluble, amino group-containing resin usable for the ink receiving layer of the ink jet recording layer of the present invention. Usually, the amino group-containing compounds include compounds having at least one member selected from (5)

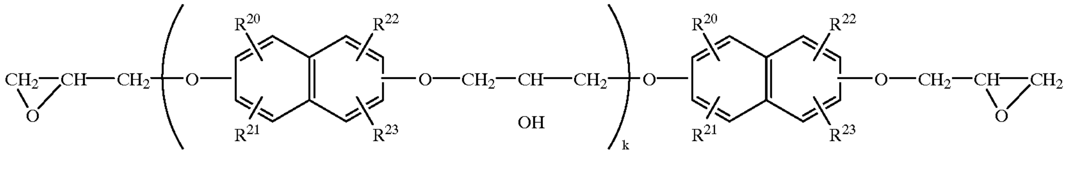

In the formula (5), $R^{20}$ to $R^{23}$, which may be the same as or different from each other, respectively represent a member selected from a hydrogen atom, alkyl groups preferably having 1 to 4 arbon atoms and halogen atoms, and k is as defined above.

The epoxy compound of the formula (1) may be an epoxydizing product of a dihydric aliphatic alcohol which may contain at least one aryl moiety.

primary, secondary and tertiary amino groups and quaternary ammonium groups.

Particularly, the amino group-containing compounds are selected from aliphatic primary amino compounds and derivatives thereof, for example, ethylamine and butylamine; aliphatic secondary amino compounds and derivatives thereof, for example, diethylamine and dibutylamine; aliphatic tertiary amino compounds and derivatives thereof, for example, triethylamine and tributylamine; aliphatic polyamine compounds and derivatives thereof, for example, ethylenediamine and diethylenetriamine; aliphatic alkanolamine compounds and derivatives thereof, for example, mono-ethanolamine, diethanolamine and triethanolamine; aromatic amino compounds and derivatives thereof, for example, aniline, xylenediamine, diaminodiphenylmethane, and diaminodiphenylether; phenolic hydroxyl group-containing aromatic amino compounds and derivatives thereof, for example, aminophenol; and imidazole, hydrazide, dicyandiamide, ammonia and pyridine and derivatives thereof.

The water-insoluble, amino group-containing resin can be easily produced by reacting the epoxy group-containing compounds with the amino group-containing compounds in the presence or absence of a catalyst at a temperature of −10° C. to 200° C. for 5 minutes to 20 hours.

There is no specific limitation to the particle size of the fine particles of the water-insoluble, amino group-containing resin to be contained in the ink receiving layer. Usually, the particle size of the fine particles of the water-insoluble, amino group-containing resin is preferably 0.05 to 30 $\mu$m, more preferably 0.05 to 10 $\mu$m.

The water-insoluble, amino group-containing resin to be contained in the ink receiving layer of the ink jet recording sheet of the present invention is preferably finely divided into fine particles by an emulsify-dispersing method. The fine particles preferably have an average particle size of 0.05 to 10 $\mu$m, more preferably 0.5 to 5 $\mu$m.

When the average particle size of the fine particles of the water-insoluble, amino group-containing resin to be contained in the ink receiving layer is too large, the images formed in the resultant ink receiving layer may have an unsatisfactory dot form. Also, when the average particle size is too small, the resultant ink receiving layer may exhibit an insufficient drying property of the ink images recorded thereon.

When the water-insoluble, amino group-containing resin is divided too strongly by a mechanical pulverizing method, the resultant particles of the resin have non-uniform irregular form and not a uniform spherical form. Therefore, when the particles of the water-insoluble, amino group-containing resin produced by the mechanical pulverizing method are contained in an ink receiving layer, the ink images formed in the resultant ink receiving layer may exhibit an unsatisfactory dot form and thus the ink receiving layer may have a insufficient image-recording performance.

When the water-insoluble, amino group-containing resins are finely divided by the emulsify-dispersing method, the resultant fine particles have a uniform spherical form. Therefore, the ink receiving layer containing the fine particles of the water-insoluble, amino group-containing resin prepared by the emulsify-dispersing method can record clear ink images having good dot form and exhibits an excellent recording performance.

Also, when the water-insoluble, amino group-containing resin is finely divided by the emulsify-dispersing method, hydrophilic groups, for example, amino groups of the resin molecules tend to be located in the outer surface portions of the resultant resin particle, and thus the resultant resin particles exhibit an enhanced reactivity and function. Therefore, the fine particles of the water-insoluble, amino group-containing resin prepared by the emulsify-dispersing method is contained in an ink receiving layer, the resultant ink receiving layer can form ink images having an enhanced water-resistance therein.

The emulsify-dispersing method for the water-insoluble, amino group-containing resin include forced emulsify-dispersing methods in which a nonionic, cationic or anionic surfactant is used as an aqueous dispersing agent, and selfdisperse-emulsifying methods in which a self-dispersing resin is used as an aqueous dispersing agent.

Particularly, in the forced emulsify-dispersing method, a water-insoluble, amino-group-containing resin is fluidized by heating or dissolving in a solvent, a surfactant is added to the fluidized resin and then the resultant mixture is compulsorily emulsify-dispersed by applying a shearing force to the mixture while adding water. In the self-disperse emulsifying method, a mixture of a self aqueous dispersing resin and a water-insoluble, amino group-containing resin is made into an organic phase, then water is added to the organic phase mixture or the organic phase mixture is added into an aqueous medium, so as to allow the mixture to be self-dispersed and to form a core-in-shell type emulsion.

The above-mentioned average particle size of the water-insoluble, amino group-containing resin particles is a number average median size measured by a Coulter counter model TA-11 (made by Coulter Electronics Co.).

The content of the water-insoluble, amino group-containing resin particles contained in the form of fine particles in the ink receiving layer is preferably 30% by weight or more based on the total weight of pigments in the ink receiving layer. The ink receiving layer may contain, in addition to the water-insoluble, amino group-containing resin particles, at least one additional pigment different from the water-insoluble, amino group-containing resin particles, for example, conventional inorganic and organic particles usable for conventional ink receiving layer, in an amount of 70% by weight or less, based on the total amount of the pigments contained in the ink receiving layer.

The additional pigments usable as pigments other than the water-insoluble, amino group-containing resin, include inorganic pigments, for example, synthetic silica, calcium carbonate, barium sulfate, titanium dioxide, zinc oxide, zinc carbonate, satin white, aluminum silicate, magnesium silicate, and alumina; and organic pigments, for example, plastic pigments, urea resin pigments and melamine resin pigments, and preferably have an oil absorption of 20 to 300 ml/100g, more preferably 100 to 300 ml/100g. The additional pigments different from the water-insoluble, amino group-containing resin may be employed alone or in a mixture of two or more thereof. When employed as a mixture, the mixture preferably has the above-mentioned oil absorption value.

In the ink receiving layer, the resin for the binder is preferably employed in an amount of 5 to 40 parts by weight, more preferably 10 to 40 parts by weight per 100 parts by weight of the total of the fine particles of the water-insoluble, amino group-containing resin and an additional pigment different from the above-mentioned resin.

The ink receiving layer has to have a thickness sufficient to fully absorb the ink jetted toward the layer and to enable the formation of the layer to be smoothly carried out. Usually, the ink receiving layer has a thickness of 1 to 20 $\mu$m, preferably 2 to 15 $\mu$m.

In the ink jet recording sheet of the present invention having the above-mentioned constitution, an anchor resin layer is formed on a surface of a support sheet on which surface an ink receiving layer will be formed, by coating the surface with an aqueous emulsion comprising an acrylic resin, polyurethane resin or a styrene-butadine copolymer resin, and then an ink receiving layer is formed on the anchor resin layer by coating it with an aqueous dispersion of a mixture of fine particles of the water-insoluble, amino group-containing resin with a binder comprising an aqueous solution of an water-soluble polymeric material or an aqueous emulsion of an acrylic resin or a styrene-butadiene copolymer resin. In the above-mentioned procedure, no coating liquid containing an organic solvent is used. Therefore, by the above-mentioned procedure, the ink jet recording sheet of the present invention can be produced at a low cost while preventing pollution of environment and process machines and apparatuses with the organic solvent.

Optionally, the opposite surface of the support sheet to the surface on which the ink receiving layer is formed, is laminated with a plastic film or paper sheet. Also, on the opposite surface of the support sheet, a pressure sensitive adhesive layer and a release sheet may be successively laminated, to provide an ink jet recording sheet capable of being adhered to a desired article under pressure, and thus usable for forming seals, emblems, badges and stickers.

In the ink receiving layer containing the water-insoluble, amino group-containing resin pigment having a total amine value of 5 to 500, the resin pigment is dispersed or emulsify-dispersed in the form of fine particles. The fine particles serve as an organic pigment for forming pores capable of absorbing therein the jetted ink, and enhance the ink-fixing performance of the ink receiving layer. Also, the amino groups of the water-insoluble, amino group-containing resin pigment react with sulfonic acid groups of dye contained in the jetted ink to form images having excellent water resistance and light fastness. Namely, the fine particles of the water insoluble, amino group-containing resin pigment impart high water resistance and light fastness to the ink images recorded in the ink receiving layer.

Also, the fine particles of the water-insoluble, amino group-containing resin have a heat melt-bonding property and thus the ink receiving layer containing the fine particle of the water-insoluble, amino group-containing resin pigment exhibits a heat melt-bonding (sealing) property.

Due to the above-mentioned features, the ink jet recording sheet of the present invention has an excellent ink-fixing property for the jet ink and can record thereon ink images having excellent water resistance and light fastness. Also, when the ink images are formed on the ink receiving layer of the present invention, the ink does not bleed from images even in a high humidity atmosphere and are not deteriorated even by the irradiation of light for a long time. Therefore the recorded images can be stably maintained in the ink receiving layer. Also, portions of the ink receiving layers can be heat-bonded (sealed) to each other, or the ink receiving layer can be heat-bonded (sealed) to the back surface of the support sheet.

Also, in the ink jet recording sheet of the present invention, the ink receiving layer may contain a conventional ink-fixing agent comprising, for example, a quaternary ammonium salt component. The ink-fixing agent contained in the ink receiving layer can react with the dye contained in the ink and thus can form ink images having an enhanced water resistance.

However, to attain the above-mentioned effect of the quaternary ammonium salt compound, it is necessary that an inorganic pigment, for example, silica, having a large specific surface area is contained in a large amount with respect to the amount of the quaternary ammonium salt compound, in the ink receiving layer. The reason for the co-use of the inorganic pigment with the quaternary ammonium salt compound is that the above-mentioned effect can be attained when the quaternary ammonium salt compound are spread on the surfaces of the pigment particles and fixed to the surfaces and the quaternary ammonium salt compound can react with the ink jetted toward the ink receiving layer to fix the dye.

In this case, the coating liquid for the ink receiving layer contains a large amount of the inorganic pigment particles having a large specific surface area and a high oil absorption and thus is difficult to be prepared. Also, the coating liquid has a thixotropic Theological property and thus there are many problems in forming the ink receiving layer by coating.

Further, since the reactivity of the quaternary ammonium salt compound increases with a decrease in the molecular weight thereof, the smaller the molecular weight of the quaternary ammonium salt compound, the higher the water resistance-enhancing effect by the reaction of the dye in the jet ink with the quaternary ammonium salt compound. However, a problem that the ink images formed in the ink receiving layer containing a quaternary ammonium salt compound with a small molecular weight exhibits a poor light fastness, and is thus easily faded when exposed to light, occurs.

Compared with the conventional ink fixing agent, the fine particles of the water-insoluble, amino group-containing resin pigment contained in the ink receiving layer of the ink jet recording sheet of the present invention have a jet ink-absorbing effect due to pores formed between the fine particles and capable of absorbing the jet ink, a ink-fixing effect due to the reaction of the fine particles with the dye in the jet ink and a heat melt-boding effect. Therefore, the ink receiving layer containing the fine particles exhibits an enhanced jet ink-fixing property and the resultant ink images have an excellent water resistance. Therefore, the ink does not bleed from the images even in a high humidity atmosphere, and the recorded images exhibit an excellent light fastness and are not faded even when exposed to light for a long time.

Accordingly, the recorded images can be stably held. Also, the ink receiving layer per se has a heat-bonding (sealing) property.

Accordingly, when the ink jet recording sheet of the present invention is employed as a packing material, the resultant package can be sealed at a sealing portion thereof by heat-bonding portions of the surface of the ink jet receiving sheet with each other.

When the support sheet is formed from a heat melt-bonding material, or when a heat melt-bonding layer is formed on a surface of the support sheet opposite to the surface thereof on which the ink receiving layer is formed, the ink receiving layer can be heat melt-bonded to the opposite surface of the support sheet or the heat melt-bonding layer formed on the opposite surface of the support sheet. Therefore, when the ink jet recording sheet is employed as a packing material, the resultant package can be heat-sealed at sealing portions thereof by heat melt-bonding portions of the ink receiving layer surface to each other or a portion of the ink receiving layer surface to a portion of the opposite surface of the supporting sheet or the heat melt-bonding layer formed on the opposite surface of the supporting sheet.

When the ink jet receiving sheet of the present invention is employed as a packing material, the head seal of the seating portion of the resultant package can be formed by a heat seal method in which the sealing portion is heat-pressed by a heating plate heated to a desired temperature, an impulse melt-cutting seal method, melt seal method, high frequency seal method or ultra-sonic seal method.

In a preferred embodiment of the present invention, since the fine particles of the water-insoluble, amino group-containing resin contained in the ink receiving layer are ones produced by an emulsify-dispersing method, and thus the resultant particles are in a uniform spherical particle form, the ink images recorded in the resultant ink receiving layer have good dot form and exhibit an excellent resolving effect.

EXAMPLES

The particular constitution of the ink jet recording sheet of the present invention will be further explained by the following examples. Also, the specific properties of the ink jet recording sheet of the present invention will be explained in comparison with the comparative ink jet recording sheets of the following comparative examples.

Example I-1

Preparation of Dispersion (1)

An aqueous dispersion having a total solid content of 30% by weight was prepared from 100 parts by weight of fine particles (A) a water insoluble, amino group-containing resin (trademark: ZX-1163-4, made by TOHTO KASEI CO., LTD.) consisting of a compound represented by the formula (6):

(6)

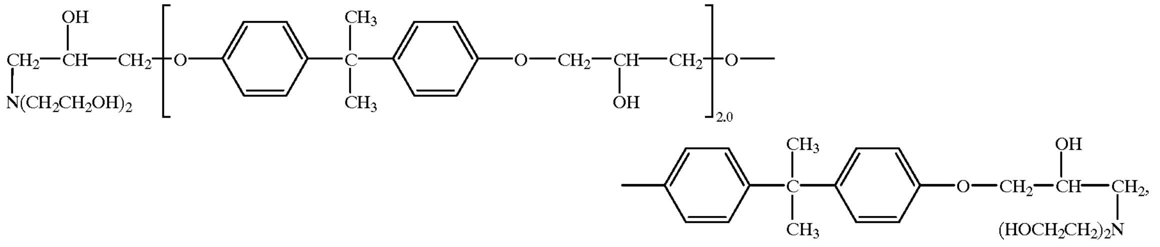

and having a total amine value of 53, a glass transition temperature of 58° C. and a weight number molecular weight of 3900 and 5 parts by weight of a dispersing agent (trademark: KS 1333, made by Arakawa Kagaku K.K.), comprising an ammonium salt of a half-esterification product of a styrene-maleic acid copolymer. The aqueous dispersion was treated in a paint shaker for 16 hours, to provide a dispersion (1).

Preparation of Coating Liquid (1)

A coating liquid (1) having a total solid content of 30% by weight was prepared by mixing 350 parts by weight of the dispersion (1) with 36.5 parts by weight of an aqueous dispersion of an ethylene-vinyl acetate copolymer (trademark: Sumikaflex 401, made by Sumitomo Kagaku K.K.) having a solid content of 55.0% by weight, 4.8 parts by weight of a fluorescent dye (trademark: Keikol BXNL, made by Nihon Soda K.K.) and a balance consisting of water and fully stirring the mixture.

Production of Ink Jet Recording Sheet

A coating liquid (1) was coated on a surface of a support sheet consisting of a wood-free paper sheet having a basis weight of 90 $g/m^2$ by using a bar coater and the resultant coating liquid layer was dried to provide an ink receiving layer in a dry amount of 10 $g/m^2$ An ink jet recording sheet was obtained.

Example I-2

An ink jet recording sheet was produced by the same procedures as in Example I-1 with the following exceptions.

In the preparation of the dispersion (1), the fine particles (A) of the water-insoluble, amino group-containing resin (ZX-1163-4) were replaced by fine particles (B) of a water-insoluble, amino group-containing resin (trademark: ZX-1516-4, made by TOHTO KASEI CO., LTD.) comprising a compound represented by the formula (7):

(7)

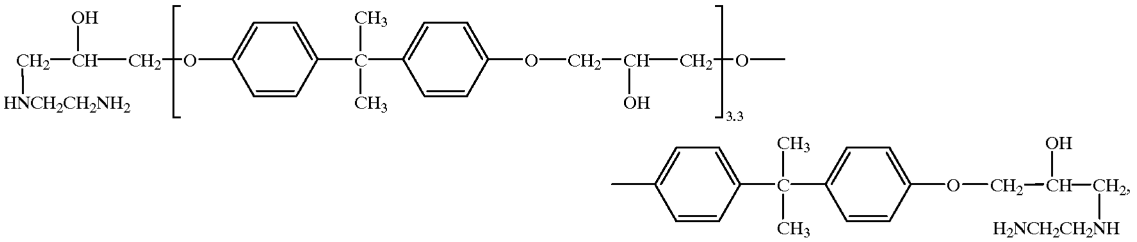

and having a total amine value of 99, a glass transition temperature of 62° C. and a weight average molecular weight of 4500.

Example I-3

An ink jet recording sheet was produced by the same procedures as in Example I-1 with the following exceptions.

In the preparation of the dispersion (1), the fine particles (A) of the water-insoluble, amino group-containing resin (ZX-1163-4) were replaced by fine particles (C) of a water-insoluble, amino group-containing resin (trademark: ZX-1163-2, made by TOHTO KASEI CO., LTD.) comprising a compound represented by the formula (6), and having a total amine value of 73.4, a glass transition temperature of 50° C. and a weight average molecular weight of 3200.

Comparative Example I-1

An ink jet recording sheet was produced by the same procedures as in Example I-1 with the following exceptions.

In the preparation of the dispersion (1), the fine particles (A) of the water-insoluble, amino group-containing resin (ZX-1163-4) were replaced by fine particles (D) of an amino group-free resin (trademark: YD-014, made by TOHTO KASEI CO., LTD.) comprising an amino group-free epoxy compound represented by the formula (8):

(8)

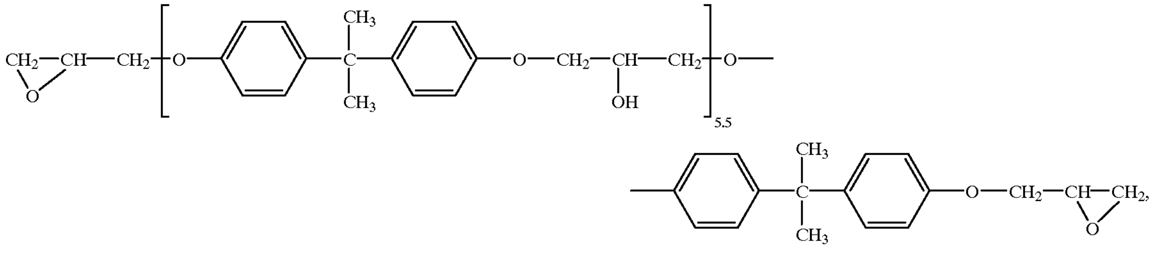

and having a glass transition temperature of 53° C. The fine particles (D) were used as a stabilizing agent.

Comparative Example I-2

An ink jet recording sheet was produced by the same procedures as in Example I-1 with the following exceptions.

In place of the coating liquid (1), a coating liquid (2) was used in the same procedures as in Example I-1. The coating liquid (2) was prepared by the following procedures.

Preparation of Dispersion (2)

An aqueous dispersion having a total solid content of 30% by weight was prepared from 100 parts by weight of the same fine particles (D) of the amino group-free resin as used in Comparative Example I-1, and 5 parts by weight of a dispersing agent (trademark: KS 1333, made by Arakawa Kagaku K.K.) comprising an ammonium salt of a half esterification product of a styrene-maleic acid copolymer, and then treated by a paint shaker for 16 hours to provide a dispersion (2).

Preparation of Coating Liquid (2)

A coating liquid (2) having a total solid content of 30% by weight was prepared by mixing 350 parts by weight of the dispersion (2) with 36.5 parts by weight of an aqueous dispersion (trademark: Sumikaflex 401, made by Sumitomo Kagaku K.K.) of an ethylene-vinyl acetate copolymer in a solid content of 55.0% by weight, 4.8 parts by weight of a fluorescent dye (trademark: Keikol BXNL, made by Nihon Soda K.K.), 15 parts by weight of a fixing agent (trademark: DM-20A, made by Asahi Denkakogyo K.K.) comprising a diallyldimethyl ammonium chloride polymer, and the balance consisting of water, and fully stirring the mixture.

Comparative Example I-3

An ink jet recording sheet was produced by the same procedures as in Example I-1 with the following exceptions.

In place of the coating liquid (1), a coating liquid (3) was used in the same procedures as in Example I-1. The coating liquid (3) was prepared by the following procedures.

Preparation of Coating Liquid (3)

A coating liquid (3) having a total solid content of 30% by weight was prepared by mixing 100 parts by weight of a silica (trademark: Sylysia 470, made by Fuji Sylysia K.K.) with 36.5 parts by weight of an aqueous dispersion (trademark: Sumikaflex 401, made by Sumitomo Kagaku K.K.) of an ethylene-vinyl acetate copolymer in a solid content of 55.0% by weight, 4.8 parts by weight of a fluorescent dye (trademark: Keikol BXNL, made by Nihon Soda K.K.), 15 parts by weight of a fixing agent (trademark: DM-20A, made by Asahi Denkakogyo K.K.) comprising a diallyldimethyl ammonium chloride polymer, and the balance consisting of water, and fully stirring the mixture.

Example I-4

Preparation of Dispersion (3)

An aqueous dispersion having a total solid content of 30% by weight was prepared from 100 parts by weight of fine particles (A) a water-insoluble, amino group-containing resin (trademark: ZX-1163-4, made by TOHTO KASEI CO., LTD.) consisting of a compound represented by the formula (6), and having a total amine value of 53, a glass transition temperature of 58° C. and a weight number molecular weight of 3900 and 5 parts by weight of a dispersing agent (trademark: KS 1333, made by Arakawa Kagaku K.K.), comprising an ammonium salt of a half-esterification product of a styrene-maleic acid copolymer. The aqueous dispersion was treated by a paint shaker for 16 hours, to provide a dispersion (3).

Preparation of Dispersion (4)

A dispersion (4) having a total solid content of 30% by weight was prepared by fully stirring a mixture of 100 parts by weight of a silica pigment (trademark: Nipsil, made by Nihon Sylisia K.K.), 40 parts by weight of an ethylene-vinyl acetate copolymer dispersion (trademark: Sumikaflex 473, made by Sumitomo Kagakukogyo K.K.) having a solid content of 55.5% by weight and a balance consisting of water.

A coating liquid (4) was prepared by mixing 350 parts by weight of the dispersion (3) with 470 parts by weight of the dispersion (4).

A surface of a support sheet consisting of a low density polyethylene film produced by an extension through a T die and having a thickness of 20 μm was treated by a corona discharge treatment.

The coating liquid (4) was coated on the corona discharge-treated surface of the support sheet and dried to form an ink receiving layer in a dry amount of 6 $g/m^2$.

An ink jet recording sheet was obtained.

Example I-5

An ink jet recording sheet was produced by the same procedures as in Example I-4 with the following exceptions.

In the preparation of the dispersion (3), the fine particles (A) of the water-insoluble, amino group-containing resin (ZX-1163-4) were replaced by fine particles (B) of a water-insoluble, amino group-containing resin (trademark: ZX-1516-4, made by TOHTO KASEI CO., LTD.) comprising a compound represented by the formula (7) and having a total amine value of 99, a glass transition temperature of 62° C. and a weight average molecular weight of 4500.

Example I-6

An ink jet recording sheet was produced by the same procedures as in Example I-4 with the following exceptions.

In the preparation of the dispersion (3), the fine particles (A) of the water-insoluble, amino group-containing resin (ZX-1163-4) were replaced by fine particles (C) of a water-insoluble, amino group-containing resin (trademark: ZX-1163-2, made by TOHTO KASEI CO., LTD.) comprising a compound represented by the formula (6), and having a total amine value of 73.4, a glass transition temperature of 50° C. and a weight average molecular weight of 3200.

Comparative Example I-4

An ink jet recording sheet was produced by the same procedures as in Example I-4 with the following exceptions.

In the preparation of the dispersion (3), the fine particles (A) of the water-insoluble, amino group-containing resin (ZX-1163-4) were replaced by the fine particles (D) of an amino group-free resin (trademark: YD-014, made by TOHTO KASEI CO., LTD.) comprising the amino group-free epoxy compound represented by the formula (8). The fine particles (D) were used as a stabilizing agent.

Comparative Example I-5

An ink jet recording sheet was produced by the same procedures as in Example I-4, except that in the preparation of the dispersion (3), the fine particles (A) of the water-insoluble, amino group-containing resin were replaced by fine particles of an ethylene-vinyl acetate copolymer having a melt viscosity of 2000 cps at a temperature of 160° C.

Comparative Example I-6

An ink jet recording sheet was produced by the same procedures as in Example I-4 with the following exceptions.

The coating liquid (4) was replaced by a coating liquid (5) which had a total solid content of 30% by weight and was prepared by fully stirring a mixture of 100 parts by weight of a silica pigment (trademark: Nipsil HD, made by Nihon Sylisia) with 36.5 parts by weight of an aqueous dispersion of an ethylene-vinyl acetate copolymer (trademark: Sumikaflex 473, made by Sumitomo Kagakukogyo K.K.) having a solid content of 55.0% by weight, 15.0 parts by weight of a fixing agent (trademark: PAS-H-1L, made by Nitto Boseki K.K.) comprising a diallyldimethyl ammonium chloride polymer and the balance consisting of water.

In the above-mentioned examples and comparative examples, the weight average molecular weights of the fine resin particles (A) to (D) were calculated from average molecular weight measured by a limiting viscosity method in accordance with Japanese Industrial Standard (JIS) K 6721-1977, 3.1 specific viscosity, for testing methods for vinyl chloride resins.

The following is a summary of the testing method.

Apparatus and Instruments The apparatus and instruments shall be as given in the following:

(1) Viscosimeter An Ubbelohde viscosimeter shall, as a rule, be used, however, a viscosimeter of any other type may be used, provided that the omission of correction on the kinetic energy is allowed as the capillary-tube dimensions and the volume of test solution are equal thereto.

(2) Chemical Balance Weighing capacity 100 to 200 g, reciprocal sensitivity 1 mg.

(3) Desiccator A dessicator using silica gel or calcium chloride as the desiccating agent.

(4) Weighing Bottle A 50 mm flat-formed weighing bottle.

(5) Measuring flask A 50 ml measuring flask.

(6) Stopwatch A stopwatch graduated in 0.2 sec.

(7) Thermostatic water tank

Reagents The reagents shall be as given in the following:

Nitrobenzene That of Extra Pure Grade, after it has been purified by drying with silica gel or calcium chloride and by vacuum distillation, may be used.

Procedure Weigh out 200±1 mg of the sample which has been dried at ordinary temperature by the chemical balance, transfer into a measuring flask, and heat to about 100° C. adding about 40 ml of the nitrobenzene. Cool when the sample has dissolved completely in appearance, further add nitrobenzene to make the total quantity 50 ml at 30±0.05° C., and consider this as test solution.

Next, pour the test solution into bulb A of the viscosimeter so that its liquid surface comes between the two marked lines. Support the viscosimeter vertically in the thermostatic water tank held at 30±0.05° C., and immerse it in the tank so that the bulb C comes below the liquid surface. When the temperature of the test solution has reached the measuring temperature, close the tube 3 with a finger tip or stop the rubber tube attached to the tube with a pinch cock or the like to close up the tube completely. Next, suck up through the rubber tube being attached to the tube 2, and after the test solution has been sucked up above the upper marked line of the bulb B, release the openings of the tubes 2 and 3. Measure flow-down time in seconds when the liquid surface of the test solution passes through from the upper marked line of the bulb B down to its lower marked line.

Measure the flow-down time in seconds of the nitrobenzene in the same manner as above, and obtain the specific viscosity to three places of decimals from the following equation. Carry out three times of measurements, and take the mean value thereof.

$$\eta_{sp}=t_2/t_1-1,$$

where $\eta_{sp}$ is the specific viscosity, $t_1$ is the flow-down time in seconds of the nitrobenzene (s) and $t_2$ is the flow-down time in seconds of the test solution (s).

With respect to the ink jet recording sheets of Examples I-1 to I-3 and Comparative Examples I-1 to I-3, the fixing property of jet ink in the ink receiving layers, and the water resistance, the light fastness, and the humidity resistance of the ink jet-recorded images formed in the ink receiving layers were measured by the following testing methods.

(1) Jet ink-fixing Property Test

A sample of an ink jet recording sheet was printed with a black-colored ink by an ink jet printer (model: MJ-700V2C, made by Epson K.K.) in an atmosphere with a temperature of 20° C. and a relative humidity (RH) of 20%. Immediate after the printing, the color density of the black colored ink images was measured by a Macbeth color density tester (model: RD914).

(2) Water Resistance Test for Recorded Images

A sample of an ink jet recording sheet was printed with a black-colored ink by an ink jet printer (model: MJ 700-V2C, made by Epson K.K.) in an atmosphere having a temperature of 20° C. and a relative humidity (RH) of 20%, the image-recorded surface of the same was immersed in a flowing water vessel at a temperature of 20° C. for 3 minutes. Then, the color density of the water-treated images was determined by the Macbeth color density tester RD914. The measured color density was compared with the color density of the images immediately after the printing.

(3) Light Fastness Test for Recorded Images

A sample of an ink jet recording sheet was printed with a black-colored ink by an ink jet printer (model: MJ 700-V2C, made by Epson K.K.) in an atmosphere having a temperature of 20° C. and a relative humidity (RH) of 20%, the image-recorded surface of the sample was exposed to an irradiation by a xenon arc weatherometer (model: XWL-6R, made by Suga Shikenki K.K.) with an irradiation energy of 63 w/$m^2$ for 24 hours in an atmosphere having a temperature of 40° C. and a relative humidity (RH) of 50%, and the color density of the black colored images was determined by a Macbeth color density tester (model: RD914). The test results were compared with the test results of the printed sample immediately after the printing.

(4) Humidity Resistance Test for Recorded Image

A sample of an ink jet recording sheet was printed with magenta-colored ink by an ink jet printer (model: MJ 700-V2C, made by Epson K.K.) in an atmosphere having a temperature of 20° C. and a relative humidity (RH) of 20%, the printed sample was stored in an atmosphere having a temperature of 40° C. and a relative humidity (RH) of 90% for 24 hours. Then the degree of blotting of the ink from the images were observed by naked eye and evaluated as follows.

| Class | Ink bloting |
|---|---|
| 3 | Substantially nothing |
| 2 | Slight blotting |
| 1 | Considerable blotting |

(5) Heat Seal Test

In a sample of an ink jet recording sheet of each of Examples I-1 to I-3 and Comparative I-1 to I-3, portions of the ink receiving layer were heat bonded to each other by using a heat seal device (trademark: Polysealer 310, made by Fuji MFJ K.K.) at a temperature of 170° C. for 2 seconds. Then the heat-bonded portion was observed by naked eye and evaluated as follows.

| Class | Heat seal result |
|---|---|
| 3 | Complete bonding |
| 2 | Partial bonding |
| 1 | No bonding |

The results of the above-mentioned tests are shown in Table 1.

TABLE 1

| Example No. | Item | Color density of printed images immediate after printing | Color density of printed images after water-resistance test | Color density of printed images after weathering test | Humidity resistance | Heat seal property |
|---|---|---|---|---|---|---|
| Example I- | 1 | 1.56 | 1.54 | 1.11 | 3 | 3 |
| | 2 | 1.53 | 1.50 | 1.14 | 3 | 3 |
| | 3 | 1.55 | 1.54 | 1.18 | 3 | 3 |
| Comparative | 1 | 1.49 | 0.12 | 1.11 | 3 | 3 |
| Example I- | 2 | 1.52 | 0.56 | 0.81 | 2 | 3 |
| | 3 | 1.53 | 1.51 | 0.79 | 1 | 1 |

With respect to the ink jet recording sheets of Examples I-4 to I-6 and Comparative Examples 1-4 to I-6, the following tests were carried out.

(6) Heat Seal Test

In a sample of each ink jet recording sheet, a portion of the surface of the ink receiving layer and a portion of the surface of the low density polyethylene film layer on the support sheet were heat-bonded to each other by using a heat seal device (trademark: Polysealer 310, made by Fuji MFJ K.K.) at a temperature of 170° C. for 2 seconds. The heat-bonded portion was observed by naked eye and evaluated as follows.

| Class | Heat bonding result |
|---|---|
| 3 | Complete bonding |
| 2 | Partial bonding |
| 1 | No bonding |

(7) Wrapping test

A sample of each ink jet recording sheet was used as a packing sheet in such a manner that the ink receiving layer of the sample formed an outer surface of the resultant package.

An A4 size book having a thickness of about 1 cm was packed with the sample in the above-mentioned manner by an impulse melt-cutting seal method using a wrapping machine (made by Zandam K.K.), at a melt cutting temperature of 400° C., at a line speed of 8000 books/hr. In this wrapping procedure, a center seal portion was formed in the package by heat-bonding a portion of the ink receiving layer surface with a portion of the low density polyethylene film layer. The resultant center seal portion was observed by naked eye and evaluated as follows.

| Class | Heat seal result |
|---|---|
| 3 | Complete bonding |
| 2 | Partial bonding |
| 1 | No bonding |

(8) Print Aptitude Test

An address printing was applied to the outer surface (ink receiving layer surface) of the package prepared by the above-mentioned wrapping test by using a Scitex 6240 printing system (an ink jet printer made by Scitex Digital Printing Inc.) at a line speed of 100 to 150 m/min.

In each package, the ink jet printing could be effected with a high resolving effect. Even when the printed images were rubbed with a finger immediately after the printing, no bloting of ink from the images occurred.

(9) Water Resistance Test of Printed Images

The address-printed package prepared in the print aptitude test (8) was immersed in city water at room temperature for one hour. The blotting of ink from the printed images were observed by naked eye and evaluated as follows.

| Class | Water resistance |
|---|---|
| 2 | No blotting |
| 1 | Blotting |

(10) Drop Test for Package

The address-printed package prepared in the print aptitude test (8) was dropped from a location of 5m above a concrete floor surface toward the surface. The center seal portion of the package was observed by naked eye whether or not the seal was broken, and evaluated as follows.

| Class | Bonding strength of seal |
|---|---|
| 2 | No breakage |
| 1 | Broken |

(11) Crumple Test

The packing sheet was removed from the address-printed package prepared in the print aptitude test (8) and crumpled by hands and opened. These operations were repeated 10 times. The seal portion of the packing sheet was observed by naked eye whether or not the seal portion was broken, and evaluated as follows.

| Class | Seal portion |
|---|---|
| 2 | No breakage |
| 1 | Broken |

The results of the above-mentioned tests (6) to (11) are shown in Table 2.

TABLE 2

| Example No. | Item | Heat seal test (6) | Wrapping test (7) | Water resistance test (9) of printed images | Drop test (10) | Crumple test (11) |
|---|---|---|---|---|---|---|
| Example I- | 4 | 3 | 3 | 2 | 2 | 2 |
| | 5 | 3 | 3 | 2 | 2 | 2 |
| | 6 | 3 | 3 | 2 | 2 | 2 |
| Comparative | 4 | 3 | 3 | 1 | 2 | 2 |
| Example I- | 5 | 3 | 3 | 1 | 2 | 2 |
| | 6 | 1 | 1 | 2 | 1 | 1 |

Example II-1

An ink jet recording sheet was produced by the following procedures.

(1) Preparation of an Emulsify-dispersion of Amino group-containina Resin

A four-necked separable flask equipped with a stirrer, a thermometer, a water-dropping device and a condenser was charged with 500 parts by weight of a water-insoluble, amino group-containing resin comprising a compound represented by the formula (6):

(6)

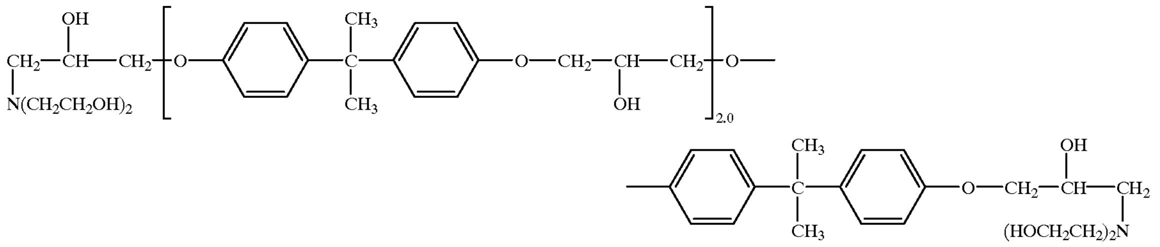

and having a total amine value of 53, a glass transition temperature of 58° C. and a weight average molecular weight of 3900, 25 parts by weight of a non-ionic surfactant (trademark: Pulronic F-88, made by Asahi Denkakogyo K.K.) comprising a polyoxyethylene-polyoxypropylene block copolymer, and 40 parts by weight of isopropyl alcohol. The mixture in the flask was heated to provide a solution of the water-insoluble, amino group-containing resin.

When the temperature of the solution in the flask reached 85° C., 160 parts by weight of water was added dropwise to the solution over a period of 30 minutes, while stirring the mixture. When the dropping of water was completed, the temperature of the mixture was 60° C., and then the mixture was further stirred at this temperature for one hour. Then, 150 parts by weight of water was added to the mixture and the resultant mixture was cooled to room temperature. By the above-mentioned procedure, an aqueous emulsify- (3) Production of Ink Jet Recording Sheet The coating liquid (II-1) was coated on a surface of a wood-free paper sheet having a basis weight of 90 $g/m^2$ and dried to provide an ink receiving layer having a dry amount of 10 $g/m^2$ on the paper sheet. An ink jet recording sheet was obtained.

Example II-2

An ink jet recording sheet was produced by the same procedures as in Example II-1 with the following exceptions.

In the preparation of the emulsify-dispersion, the fine, water-insoluble, amino group-containing resin particles (II-A) were replaced by fine particles (II-B) of a water-insoluble, amino group-containing resin comprising the compound of the formula (7):

(7)

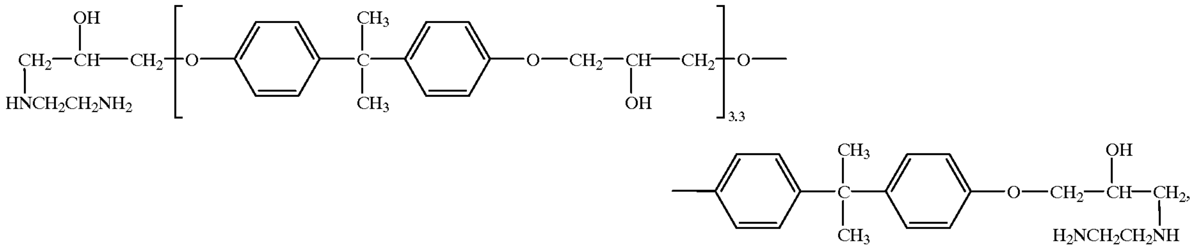

dispersion (II-A) of the water-insoluble, amino group-containing resin was obtained. In this emulsify-dispersion (II-A), the content of the water-insoluble, amino group-containing resin was 57% by weight. Also, the average particle size of the fine particles of the water-insoluble, amino group-containing resin in the emulsify-dispersion (II-A) was 2.0 μm. It was confirmed by an electron microscope observation that the fine particles were in a spherical form.

(2) Preparation of Coating liquid (II-1) for Ink Receiving Layer

A coating liquid (II-1) having a total solid content of 30% by weight was prepared by mixing the emulsify-dispersion (II-A) in an amount of 350 parts by weight with 36.5 parts by weight of an aqueous dispersion of an ethylene-vinyl acetate copolymer (trademark: Sumikaflex 401, made by Sumitomo Kagakukogyo K.K.) having a solid content of 55.0% by weight, 4.8 parts by weight of a fluorescent dye (trademark: Keikol BXNL, made by Nihon Soda K.K.) and the balance consisting of water, and fully stirring the mixture.

and having a total amine value of 99, a glass transition temperature of 62° C. and a weight average molecular weight of 4500, to provide an emulsify-dispersion (II-B).

In the emulsify-dispersion (II-B), the content of the water-insoluble, amino group-containing resin was 57% by weight, and the average particle size of the fine particles of the water-insoluble, amino group-containing resin in the emulsify-dispersion (II-B) was 3.0 μm. It was confirmed by an electron microscopic observation that the fine particles were in a spherical form.

A coating liquid for the ink receiving layer was prepared by the same procedures as in Example II-1 except that the emulsify-dispersion (II-B) was used. The resultant coating liquid (II-2) had a solid content of 30% by weight.

The coating liquid (II-2) was coated on the paper sheet by the same procedures as in Example II-1 to form an ink receiving layer. An ink jet recording sheet was obtained.

Example II-3

An ink jet recording sheet was produced by the same procedures as in Example II-1 with the following exceptions.

In the preparation of the emulsify-dispersion, the fine, water-insoluble, amino group-containing resin particles (II-A) were replaced by fine particles (II-C) of a water-insoluble, amino group-containing resin comprising the compound of the formula (6), and having a total amine value of 73, a glass transition temperature of 50° C. and a weight average molecular weight of 3200, and isopropyl alcohol was replaced by methoxypropyl alcohol, to provide an emulsify-dispersion (II-C).

In the emulsify-dispersion (II-C), the content of the water-insoluble, amino group-containing resin was 57% by weight, and the average particle size of the fine particles of the water-insoluble, amino group-containing resin in the emulsify-dispersion (II-C) was 2.0 μm. It was confirmed by an electron microscopic observation that the fine particles are in a spherical form.

A coating liquid for the ink receiving layer was prepared by the same procedures as in Example II-1 except that the emulsify-dispersion (II-C) was used. The resultant coating liquid (II-3) had a solid content of 30% by weight.

The coating liquid (II-3) was coated on the paper sheet by the same procedures as in Example II-1 to form an ink receiving layer. An ink jet recording sheet was obtained.

Comparative Example II-1

An ink jet recording sheet was produced by the same procedures as in Example II-1 with the following exception.

(1) Preparation of Aqueous Dispersion of Fine Resin Particles

An aqueous dispersion having a solid content of 30% by weight was prepared by mixing 100 parts by weight of fine particles of an amino group-free resin (trademark: YD-014, made by TOHTO KASEI CO., LTD.) comprising the compound represented by the formula (8):

(8)

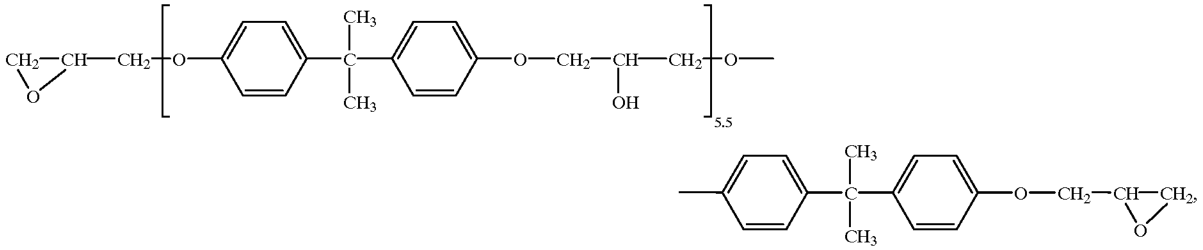

and having a glass transition temperature of 53° C., 5 parts by weight of an ammonium salt of half esterification product of styrene-maleic acid copolymer (trademark: KS 1333, made by Arakawa Kagaku K.K.) and the balance consisting of water and treating the mixture by a paint shaker for 16 hours.

(2) A coating liquid was prepared in the same manner as in Example II-1, except that the aqueous dispersion of the fine particles of the above-mentioned amino group-free resin was used in an amount of 700 parts by weight in place of 350 parts by weight of the emulsify-dispersion (II-A) in Example II-1.

(3) The coating liquid was coated on the same support sheet as in Example II-1 by the same procedures as in Example II-1 to form an ink receiving layer. An ink jet recording sheet was obtained.

Example II-4

An ink jet recording sheet was produced by the same procedures as in Example II-1 with the following exceptions.

In the preparation of the coating liquid for the ink receiving layer, 350 parts by weight of the emulsify-dispersion (II-A) of the water-insoluble, amino group-containing resin used in Example II-1 were replaced by 700 parts by weight of an aqueous dispersion of a water-insoluble, amino group-containing resin prepared in the manner as shown below. When the water-insoluble, amino group-containing resin is finely divided by grinding but not by emulsify-dispersing, the resultant particles had a wide particle size distribution and a largest particle size of about 20 μm or less (average particle size: 7 μm).

Preparation of an Aqueous Dispersion of Fine Particles of water-insoluble, Amino group-containing Resin An aqueous dispersion having a solid content of 30% by weight and containing 100 parts by weight of the same fine particles of the water-insoluble, amino group-containing resin as in Example II-1 and 5 parts by weight of dispersing agent comprising an ammonium salt of half-esterification product of styrene-maleic acid copolymer (trademark: KS 1333, made by Arakawa Kagaku K.K.) was treated by a paint shaker for 16 hours. An aqueous dispersion of the water-insoluble, amino group containing resin particles was obtained.

Comparative Example II-2

An ink jet recording sheet was produced by the same procedures as in Example II-1 with the following exception.

In the preparation of the emulsify-dispersion, the fine, water-insoluble, amino group-containing resin particles (II-A) in an amount of 350 parts by weight were replaced by 350 parts by weight of fine particles of an amino group-free resin comprising the compound of the formula (8), and having a glass transition temperature of 53° C.

In the resultant emulsify-dispersion, the particle size of the fine particles of the amino group-free resin was 2.0 μm.

Comparative Example II-3

An ink jet recording sheet was produced by the following procedures.

(1) Preparation of Coating Liquid for Ink Receiving Layer

A coating liquid having a solid content of 30% of weight was prepared by fully stirring a mixture of 100 parts by weight of a silica pigment (trademark: Sylysia 470, made by Fuji Sylysia K.K.), with 36.5 parts by weight of an aqueous dispersion of an ethylene-vinyl acetate copolymer (trademark: Sumikaflex 401, made by Sumitomo Kagakukogyo K.K.) having a solid content of 55.0% by weight, 4.8 parts by weight of a fluorescent dye (trademark: Keikol BXNL, made by Nihon Soda K.K.), 15 parts by weight of a fixing agent (trademark: DM-20A, made by Asahi Denka-kogyo K.K.) comprising a diallyldimethyl ammonium chloride polymer and the balance consisting of water.

(2) Production of Ink Jet Recording Sheet

An ink jet recording sheet was produced by the same procedures as in Example II-1, except that the ink receiving layer was formed from the above-mentioned coating liquid.

In the above-mentioned Examples II-1 to II-4 and Comparative Examples II-1 to II-4, the weight average molecular weights of the fine resin particle (A) to (D) were calculated from average molecular weight measured by a limiting viscosity method in accordance with Japanese Industrial Standard (JIS) K 6721-1977, 3.1 specific viscosity, for testing methods for vinyl chloride resins.

With respect to the ink jet recording sheets of Examples II-1 to II-4 and Comparative Examples II-1 to II-4, the fixing property of jet ink in the ink receiving layers, the water resistance, the light fastness, and the humidity resistance of the ink jet-recorded images formed in the ink receiving layers, and the image-recording property of the ink receiving layer were measured by the following testing methods.

(1) Jet ink-fixing Property Test

A sample of an ink jet recording sheet was printed with a black-colored ink by an ink jet printer (model: MJ-700V2C, made by Epson K.K.) in an atmosphere with a temperature of 20° C. and a relative humidity (RH) of 20%. Immediate after the printing, the color density of the black colored ink images was measured by a Macbeth color density tester (model: RD914).

(2) Water Resistance Test for Recorded Images

A sample of an ink jet recording sheet was printed with a black-colored ink by an ink jet printer (model: MJ 700-V2C, made by Epson K.K.) in an atmosphere having a temperature of 20° C. and a relative humidity (RH) of 20%, the image-recorded surface of the same was immersed in a flowing water vessel at a temperature of 20° C. for 3 minutes. Then, the color density of the water-treated images was determined by the Macbeth color density tester RD914. The measured color density was compared with the color density of the images immediately after the printing.

(3) Light Fastness Test for Recorded Images

A sample of an ink jet recording sheet was printed with a black-colored ink by an ink jet printer (model: MJ 700-v2C, made by Epson K.K.) in an atmosphere having a temperature of 20° C. and a relative humidity (RH) of 20%, the image-recorded surface of the sample was exposed to an irradiation by a xenon arc weatherometer (model: XWL-6R, made by Suga Shikenki K.K.) with an irradiation energy of 63 w/$m^2$ for 24 hours in an atmosphere having a temperature of 40° C. and a relative humidity (RH) of 50%, and the color density of the black colored images was determined by a Macbeth color density tester (model: RD914). The test results was compared with the test results of the printed sample immediately after the printing.

(4) Humidity Resistance Test for Recorded Image

A sample of an ink jet recording sheet was printed with magenta-colored ink by an ink jet printer (model: MJ 700-V2C, made by Epson K.K.) in an atmosphere having a temperature of 20° C. and a relative humidity (RH) of 20%, the printed sample was stored in an atmosphere having a temperature of 40° C. and a relative humidity (RH) of 90% for 24 hours. Then the degree of blotting of the ink from the images were observed by naked eye and evaluated as follows.

| Class | Ink bloting |
|---|---|
| 3 | Substantially no change |
| 2 | Slight blotting |
| 1 | Considerable blotting |

(5) Image-recording Property of Image Receiving Layer

A sample of an ink jet recording sheet was printed with black-colored ink by an ink jet printer (model: MJ-700V2C, made by Epson K.K.) The dot form and clarity the printed images were observed by naked eye and evaluated as follows.

| Class | Image quality |
|---|---|
| 3 | Dot form and image clarity (resolving effect) are good |
| 2 | Images are blotted |
| 1 | Image-blotting and projections are formed. |

The results of the above-mentioned tests are shown Table 3

TABLE 3

| Example No. | Item | Color density of printed images immediately after printing | Color density of printed images after water resistance test | Color density of printed images after light fastness test | Humidity resistance | Image-recording property |
|---|---|---|---|---|---|---|
| Example II- | 1 | 1.55 | 1.54 | 1.13 | 3 | 3 |
| | 2 | 1.54 | 1.53 | 1.16 | 3 | 3 |
| | 3 | 1.56 | 1.53 | 1.15 | 3 | 3 |
| | 4 | 1.54 | 0.95 | 1.11 | 2 | 2 |
| Comparative | 1 | 1.48 | 0.13 | 1.11 | 3 | 2 |
| Example II- | 2 | 1.53 | 0.12 | 0.15 | 1 | 3 |
| | 3 | 1.53 | 1.51 | 0.79 | 1 | 3 |

Example III-1

An ink jet recording sheet was produced by the following procedures.

(1) Preparation of Coating Liquid (III-1)

A coating liquid (III-1) having a total solid content of 30% by weight was prepared by fully stirring a mixture of 175 parts by weight of an aqueous dispersion of fine particles of a water-insoluble, amino group-resin of the formula (6):

(6)

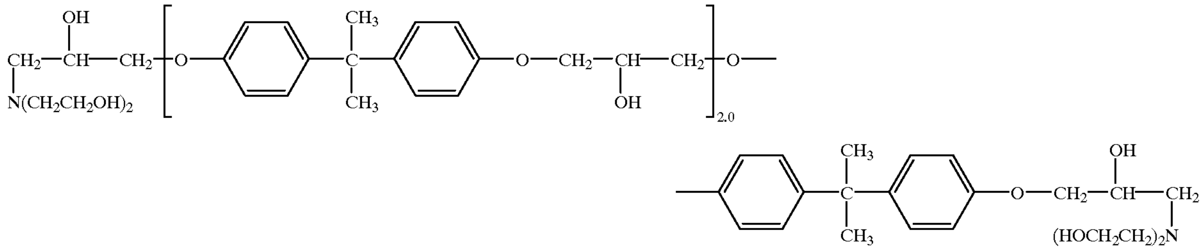

having a total amine value of 53, a glass transition temperature of 58° C., a weight average molecular weight of 3900 and average particle size of 2.0 μm, in a solid content of 57% by weight, 200 parts by weight of an aqueous solution of silicon-modified polyvinyl alcohol (trademark: R-1130, made by K.K. Kuraray) having a solid content of 10% by weight, 4.8% by weight of a fluorescent dye (trademark: Keikol BXNL, made by Nihon Soda K.K.) and the balance consisting of water.

(2) Production of Ink Jet Recording Sheet

The above-mentioned coating liquid (III-1) was coated on a surface of a wood-free paper sheet having a basis weight of 90 $g/m^2$ by using a bar coater and dried to form an ink receiving layer in a dry amount of 10 $g/m^2$. An ink jet recording sheet was obtained.

Example III-2

An ink jet recording sheet was produced by the same procedures as in Example III-1, with the following exceptions.

In the preparation of the coating liquid, the aqueous solution of the silicon modified polyvinyl alcohol (trademark: R-1130, made by K.K. Kuraray) was replaced by an aqueous solution of an acrylamide-modified polyvinyl alcohol (trademark: PC-100, made by Denki Kagakukogyo K.K.) having a solid content of 10% by weight.

Example III-3

An ink jet recording sheet was produced by the same procedures as in Example III-1, with the following exceptions.

In the preparation of the coating liquid, the aqueous solution of the silicon modified polyvinyl alcohol (trademark: R-1130, made by K.K. Kuraray) was replaced by an aqueous solution of a full saponified polyvinyl alcohol (trademark: PVA 105, made by K.K. Kuraray) having a solid content of 10% by weight.

Example III-4

An ink jet recording sheet was produced by the same procedures as in Example III-1, with the following exceptions.

In the preparation of the coating liquid, the aqueous solution of the silicon modified polyvinyl alcohol (trademark: R-1130, made by K.K. Kuraray) was replaced by an aqueous solution of an oxidized starch (trademark: Ace A, made by Oji Corn Starch K.K.) having a solid content of 10% by weight.

Example III-5

An ink jet recording sheet was produced by the same procedures as in Example III-1, except that the silicon-modified polyvinyl alcohol was replaced by an acryl emulsion (trademark: SE-2005, made by Showa Denko K.K.) having a solid content of 48%.

In the above-mentioned Examples III-1 to II-4, the weight average molecular weights of the fine resin particles (A) to (D) were calculated from average molecular weight measured by a limiting viscosity method in accordance with 3.1, specific viscosity of Japanese Industrial Standard (JIS) K 6721-1977, for testing methods for vinyl chloride resins. This melthod has been discussed earlier.

With respect to the ink jet recording sheets of Example III-1 to III-4, the porous structure in each ink receiving layer and the ink jet recording aptitude and the thermal transfer recording aptitude of each ink receiving layer were measured by the following testing methods.

(A) Porous Structure of Ink Receiving Layer Due to water-insoluble, Amino group-containing Resin Fine Particles The surface of the ink receiving layer of each ink jet recording sheet was observed by using a scanning electron microscope at a magnification of 2000 to confirm the porous structure formed in the ink receiving layer. The porous structure was evaluated as follows.

| Class | Porous structure |
|---|---|
| 3 | A porous structure having a high porosity is formed in the ink receiving layer |
| 2 | A porous structure having a low porosity is formed |
| 1 | No porous structure is formed. |

(B) Ink Jet Recording Aptitude Test (1) Jet Ink Absorption Test

Test (1)

A sample of each ink jet recording sheet was printed with a black-colored ink by an ink jet printer (model: MJ-5000C, made by Epson K.K.), and the ink absorption of the ink receiving layer of the sample was observed by naked eye and evaluated as follows.

| Class | Ink absorption |
|---|---|
| 3 | Excellent |
| 2 | Good |
| 1 | Poor |

Test (2)

The ink absorption of the ink receiving layer of each ink jet recording sheet was evaluated by measuring a dynamic contact angle of a water drop formed on the ink receiving layer by a dynamic absorption tester (made by FIBRO Co.) in accordance with TAPPI, T558

The following is a summary of the testing method.

A drop of a specified volume of water or another agreed test liquid is automatically applied to a test specimen surface using a liquid delivery system and specified deposition parameters. Images of the drop in contact with the substrate are captured by a video camera at specified time intervals following deposition.

At a specified time after drop deposition, which is varied based upon the sorptive or barrier properties of the substrate/liquid interface, the test is terminated. The contact angle between the drop and substrate at various time intervals following drop deposition are determined by image analysis techniques on the captured images, and the contact angle at specified time(s), the rate of change of the contact angle change as a function of time, and changes in droplet height and diameter, as well as other test variables are analyzed, based on specific information requirements for the materials being tested.

The test method is divided into two parts, Methods A and B, which vary only in certain procedural aspects and allow the use of the automated procedure over the wide range of sample types.

To identify the applicable Procedure A or B, a drop of the standardized size is formed at the tip of the liquid delivery system. The drop is then slowly lowered manually towards the specimen surface until contact is initiated between the liquid and the specimen. Procedure A is to be used if the drop releases immediately from the tip on contact with the specimen surface. Procedure B is to be used if the drop remains attached to the tip on contact with the specimen surface.

In order to measure the highest contact angle possible, the drop should be applied as gently as possible. with Procedure A the drop can be applied with a very short stroke, as the drop will release from the liquid delivery system immediately on contact with the specimen surface. Therefore the Procedure A should be tried as the first option.

Procedure A gives specific conditions for the testing of sheeted materials having contact angles with water less than about 1000. Materials of this type are generally sorbent papers.

Procedure B gives specific conditions for testing of sheeted materials having contact angles with water above about 1000. Procedure B is applicable when the drop is not immediately released from the liquid delivery system on contact with the specimen surface.

In cases where a liquid other than water is used, the specific procedure applied will depend on the contact angle between the liquid and the specimen substrate. For example, where the film side of a paper-film laminate, or a polymer film itself, is tested with a liquid whose surface tension is approximately equal to or below that of the film, the contact angle at the liquid/substrate will approach zero, and Procedure A would be used. If the same film were tested with water as the liquid, Procedure B might be appropriate. The procedure is chosen based on the resulting interfacial wetting properties, not the identity of the liquid or specimen substrate.

The ink absorption of the ink receiving layer is evaluated as follows.

| Class | Ink absorption rate |
|---|---|
| 3 | Fast |
| 2 | Slow |
| 1 | Substantially no absorption |

(2) Jet ink-fixing Property Test

A sample of an ink jet recording sheet was printed with a black-colored ink by an ink jet printer (model: MJ-5000C, made by Epson K.K.) in an atmosphere having a temperature of 20° C. and a relative humidity (RH) of 20%, and the color density of the black colored ink images was measured by a Macbeth color density tester (model: RD914).

(3) Water Resistance Test for Recorded Images

A sample of an ink jet recording sheet was printed with a black-colored ink by an ink jet printer (model: MJ-5000C, made by Epson K.K.) in an atmosphere having a temperature of 20° C. and a relative humidity (RH) of 20%, the image-recorded surface of the sample was immersed in a flowing water vessel at a temperature of 20° C. for 3 minutes. Then, the color density of the water-treated images was determined by the Macbeth color density tester RD914. The measured color density was compared with the color density of the images immediately after the printing.

(4) Light Fastness Test for Recorded Images

A sample of an ink jet recording sheet was printed with a black-colored ink by an ink jet printer (model: MJ-5000C, made by Epson K.K.) in an atmosphere having a temperature of 20° C. and a relative humidity (RH) of 20%, the image-recorded surface of the sample was exposed to an irradiation from a xenon arc weatherometer (model: XWL-6R, made by Suga Shikenki K.K.) with an irradiation energy of 63 $w/m^2$ for 24 hours in an atmosphere having a temperature of 40° C. and a relative humidity (RH) of 50%, and the color density of the black colored images was determined by a Macbeth color density tester (model: RD914). The test results was compared with the test results of the printed sample immediately after the printing.

(5) Image-recording Property of Image Receiving Layer

A sample of an ink jet recording sheet was printed with a black-colored ink by an ink jet printer (model: MJ-5000C, made by Epson K.K.) The dot form and clarity the printed images were observed by naked eye and evaluated as follows.

| Class | Image quality |
|---|---|
| 3 | Dot form and image clarity (resolving effect) are good |
| 2 | Images are blotted |
| 1 | Image-blotting and projections are formed. |

The results of the above-mentioned tests are shown in Table 4.

TABLE 4

| Example No. | Item | Porous structure | Ink absorption Test(1) | Test(2) | Color density of printed images immediately after printing | Color density of printed images after water resistance test | Color density of printed images after light fastness test | Image-recording property |
|---|---|---|---|---|---|---|---|---|
| Example III- | 1 | 3 | 3 | 3 | 1.63 | 1.61 | 1.2 | 3 |
| | 2 | 2–3 | 2 | 3 | 1.68 | 1.65 | 1.25 | 3 |
| | 3 | 3 | 3 | 3 | 1.55 | 1.54 | 1.19 | 3 |
| | 4 | 3 | 3 | 3 | 1.52 | 1.48 | 1.15 | 3 |
| | 5 | 1 | 2 | 1 | 1.65 | 1.62 | 1.21 | 2 |

(C) Thermal Transfer Printing Aptitude Test (1) Dot Reproducibility of Ink Receiving Layer The ink receiving layer of each ink jet recording sheet was thermal transfer-printed with a black colored ink toner sheet (made by Fuji Kagakushi K.K.) by using a word processor (model: WD-800, made by Sharp K.K.) in an atmosphere having a temperature of 20° C. and a relative humidity (RH) of 20%, and dots was photographed. The photographed dots were evaluated by naked eye as follows.

| Class | Dot reproducibility |
|---|---|
| 3 | Excellent |
| 2 | Good |
| 1 | Poor |

(2) Color Density (transfer efficiency)

An ink receiving layer of each ink jet recording sheet was thermal transfer-printed with a black colored ink toner sheet (made by Fuji Kagakushi K.K.) by using a word processor (model: WD-800, made by Sharp K.K.) in an atmosphere having a temperature of 20° C. and a relative humidity (RH) of 20%. The color density (transfer efficiency) of the printed black colored images was measured by MacBeth color density tester RD914.

(3) Uniformity in Color Density of Printed Images

An ink receiving layer of each ink jet recording sheet was thermal transfer-printed with a black colored ink toner sheet (made by Fuji Kagakushi K.K.) by using a word processor (model: WD-800, made by Sharp K.K.) in an atmosphere having a temperature of 20° C. and a relative humidity (RH) of 20%. The solid printed images were photographed and the uniformity in color density of the photographed images was observed by naked eye and evaluated as follows.

| Class | Uniformity in color density |
|---|---|
| 3 | Uniform |
| 2 | Slightly non-uniform |
| 1 | Non-uniform |

The results of the above-mentioned tests are shown in Table 5.

TABLE 5

| Example No. | Item | Dot-reproducibility | Color density of images (Transfer efficiency) | Uniformity in color density |
|---|---|---|---|---|
| Example III- | 1 | 3 | 1.88 | 3 |
| | 2 | 2–3 | 1.82 | 3 |
| | 3 | 3 | 1.90 | 3 |
| | 4 | 3 | 1.85 | 3 |
| | 5 | 1 | 1.37 | 1 |

The ink jet recording sheet of the present invention has an excellent fixing property to the jet ink and can record ink images having excellent water resistance and light fastness. Therefore, even under high humidity, no ink-blotting from the recorded ink occurs, and even when exposed to light for a long time, the recorded images are not deteriorated, to maintain stable images.

Also, since the ink jet recording sheet of the present invention includes an ink receiving layer which per se has a heat-bonding property, when the ink jet recording sheet is employed as a packing material, portions of the outer surface, which is formed by the ink receiving layer, of the package can be heat-bonded to each other to form a front surface to front surface seal portion.

Further, in the ink jet recording sheet of the present invention, when a surface of the support sheet opposite to the surface thereof on which the ink receiving layer is formed has a heat-bonding property, this type of ink jet recording sheet can be heat-bonded at a portion of the ink receiving layer surface to a portion of the opposite surface of the support sheet to form a front surface to back surface seal portion.

Due to the above-mentioned properties, the ink jet recording sheet of the present invention is usable as a packing sheet for packages to be transported by a postal service or non-postal service. In this case, the packing sheet per se can be heat-sealed to form a seal portion.

When the ink jet recording sheet of the present invention is used as a packing material, addresses and names of the addressor and addressee and other matter (PR matter) are printed on the front (ink receiving layer) surface before or after packing. When the package has no flat face, a curved face thereof can be printed by a non-contact type recording system, for example, ink jet recording system. When the package has a flat face, the flat face can be printed by the non-contact type printing system, or a contact-type printing system, for example, a dot printer or a thermal transfer printer.

In conventional mailed matter, a series of labels recording the name and address of the addressee are provided, and each label was adhered to a front surface of the package. In this case, if an error occurs in the adhesion of the label, the label must be re-prepared. However, it is practically impossible to extract a particular name and address from a great number of records and to re-prepare the necessary label. Therefore, if the error in adhesion of the label occurs, the package is not sent to the target address.

Compared with this, when the ink jet recording sheet of the present invention is used as a packing sheet to form a package, the name and address of the addressee can be recorded on the ink receiving layer surface of each package. Therefore, no error in adhesion of the label occurs. Thus, no omission in sending of the package occurs.

Also, in the ink jet recording sheet of the present invention, the ink receiving layer can be formed by coating an aqueous coating liquid on a surface of the support sheet.

Therefore, the production of the ink jet recording sheet of the present invention does not cause an operational disadvantage derived from employment of a coating liquid containing an organic solvent.

Further, in the ink jet recording sheet of the present invention, the fine particles of the water-insoluble, amino group-containing resin contained in the ink receiving layer have a heat melt-bonding property, and thus the appearance of the ink receiving layer is good and the ink receiving layer formed on the support sheet is not separated during handling the ink jet recording sheet of the present invention.

What is claimed is:

1. An ink jet recording sheet comprising a support sheet, and an ink receiving layer formed on a surface of the support sheet and comprising a binder and fine particles of a water-insoluble, amino group-containing resin which is a reaction product of a compound having at least one epoxy group per molecule of the compound with a compound having at least one amino group per molecule of the compound and having a total amine value of 5 to 500 and mixed with the binder, the ink receiving layer having pores formed between the water-insoluble, amino group-containing resin particles and exhibiting enhanced ink-absorbing properties.

2. An ink jet recording sheet as claimed in claim 1, wherein the water-insoluble, amino group-containing resin has a glass transition temperature of 15 to 250° C.

3. The ink jet recording sheet as claimed in claim 1, wherein the epoxy group-containing compound is selected from those of the formulae (1) and (2):

(1)

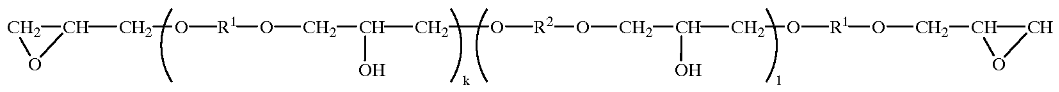

and (2)

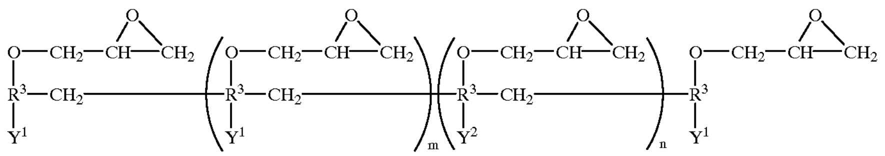

wherein —O—$R^1$—O— and —O—$R^2$—O— respectively and independently from each other represent a member selected from the group consisting of residues of aromatic dihydroxyl compounds and residues of aliphatic dihydric alcohols; k and l respectively and independently from each other represent an integer of 0 or 1 or more; —O—$R^3$— represents a residue of a monohydroxyaryl compound; $Y^1$ and $Y^2$ respectively and independently from each other represent a member selected from the group consisting of a hydrogen atom, halogen atoms, glycidyl ether groups, alkyl groups, aryl groups, and aralkyl groups, the alkyl, aryl and aralkyl groups respectively may be substituted with at least one glycidyl moiety; and n and m respectively and independently from each other represent an integer of 0 or 1 or more.

4. The ink jet recording sheet as claimed in any of claims 1, 2 and 3, wherein a surface of the support sheet which is opposite to the surface on which the ink receiving layer is formed, is capable of heat bonding to the ink receiving layer and/or the ink receiving layer is capable of heat bonding at portions thereof to each other.

5. The ink recording sheet as claimed in claim 1, 2 and 3, wherein a surface of the support sheet which is opposite to the surface on which the ink receiving layer is formed, is coated with a heat-sealing layer comprising a hot melt-bonding resin.

6. The ink jet recording sheet as claimed in claim 1, 2 and 3, where the water-insoluble, amino group-containing resin particles have an average particle size of 0.05 to 10 μm.

7. The ink jet recording sheet as claimed in claim 1 or 2, wherein the water-insoluble, amino group-containing resin particles are ones prepared by pulverizing the resin by an emulsify-dispersing method.

8. The ink jet recording sheet as claimed in claim 1, wherein the binder comprises a water-soluble polymeric material.

9. The ink jet recording sheet as claimed in claim 8, wherein the water-soluble polymeric material for the binder comprises at least one member selected from the group consisting of starch, oxidized starch, hydroxyethylcellulose, methylcellulose, carboxymethylcellulose, gelatin, casein, polyvinyl alcohol, modified polyvinyl alcohols, styrene-maleic anhydride copolymers and ethylene-maleic anhydride copolymers.

* * * * *